United States Patent [19]

Oka et al.

[11] Patent Number: 5,113,083
[45] Date of Patent: May 12, 1992

[54] LIGHT SCATTERING MEASURING APPARATUS UTILIZING A PHOTODETECTOR MOUNTED ON A ROTARY STAND

[75] Inventors: Koichi Oka, Otsu; William Otani, Koga; Yasuhiro Kubo, Koga; yasushi Zasu, Koga; Motonobu Akagi, Koga, all of Japan

[73] Assignee: Otsuka Electronics Co., Ltd., Osaka, Japan

[21] Appl. No.: 465,186

[22] PCT Filed: Jul. 17, 1989

[86] PCT No: JP89/00717
§ 371 Date: Mar. 26, 1990
§ 102(e) Date: Mar. 26, 1990

[30] Foreign Application Priority Data

Jul. 25, 1988 [JP] Japan .................................. 63-185142

[51] Int. Cl.⁵ ............................................ G01N 15/06
[52] U.S. Cl. .................................... 250/574; 250/575
[58] Field of Search ............. 250/574, 575, 561, 227.27, 250/235, 236; 356/28.5, 338

[56] References Cited

U.S. PATENT DOCUMENTS

| | | | |
|---|---|---|---|
| 3,732,014 | 5/1973 | Urgiris | 356/336 |
| 4,242,194 | 12/1980 | Steiner et al. | 356/337 |
| 4,466,738 | 8/1984 | Huang et al. | 356/28.5 |
| 4,611,916 | 9/1986 | Yoshizumi | 356/360 |
| 4,990,791 | 2/1991 | Nishi | 250/561 |

Primary Examiner—David C. Nelms
Assistant Examiner—T. Davenport
Attorney, Agent, or Firm—Sughrue, Mion, Zinn, Macpeak & Seas

[57] ABSTRACT

A rotary stand (11) having a half-mirror (8) and a photodetector (10) mounted thereon, is continuously rotated around a first rotary shaft (A) passing through a sample (S), and set to a predetermined scattering angle. Simultaneously, a rotary reflecting mirror (7) is rotated at a predetermined angle to direct a reference li8ght (LR) to the half-mirror (8) at all times. The half-mirror (8) is also rotated at its own axis at a predetermined angle so that the direction of a scattering light (LS) at the light emitting side of the half-mirror (8) is identical with the direction of the reference lilght (LR). Accordingly, the reference light may be composed with the scattered light at an arbitrary scattering angle, enabling observation of the Doppler shift in the scattered light direction (FIG. 1).

11 Claims, 8 Drawing Sheets

(a)

(b)

LIGHT SCATTERING MEASURING APPARATUS UTILIZING A PHOTODETECTOR MOUNTED ON A ROTARY STAND

FIELD OF THE INVENTION

The present invention relates to a light scattering measuring apparatus for measuring, at an arbitrary scattering angle, the Doppler shift of the scattered light from a sample.

BACKGROUND OF THE INVENTION

The light scattering measuring apparatus is used as an optical measuring apparatus in which a laser light is irradiated to colloid particles in a fluid, blood corpuscles in blood or the like and the Doppler shift of the scattered light is observed, thereby to measure the moving velocity of the particles.

As the light scattering measuring apparatus of the type above-mentioned, a heterodyne-type light scattering measuring apparatus is widely used in which the scattering light is heterodyne-detected with the use of a reference light obtained by splitting light from the same light source, so that the frequency distribution of the scattered light is detected with precision.

In the heterodyne-type light scattering measuring apparatus, it is preferable to make a provision such that the light scattering measuring angle is continuously changed. This is because, in such an arrangement, particles having a variety of sizes may be efficiently measured and the velocity distribution of particles having a size distribution may be measured according to the scattering angle. Accordingly, a variety of light scattering measuring apparatus of this type have been proposed.

For example, there has been proposed (1) apparatus, as shown in FIG. 6, in which the incident light LD and the reference light LR parallel thereto are formed from a laser beam L with the use of a half-mirror BS and a reflecting mirror P, and both lights are incident upon a large-diameter convex lens LE, and the scattering light LS from a sample S at the focal position F of the convex lens LE is measured together with the reference light LR (E. E. Uzgiris, D. H. Cluxton, Rev. Sci. Instrum, 51 (1), Jan. 1980).

In the light scattering measuring apparatus above-mentioned, the Doppler shift may be observed according to the heterodyne method. However, to change the scattering angle $\theta$, it is required to adjust the incident position of the reference light LR with the use of the general nature that the refraction angle of light incident upon a convex lens becomes greater as the incident point is separated away from the center of the convex lens. It is therefore necessary to move the reflecting mirror P to change the distance X between the direct light LD and the reference light LR. In addition to such a movement of the reflecting mirror P, the rotation of the position of a photodetector DET for receiving the scattering light LS, around the focal point F of the lens LE is also required.

However, even though the reflecting mirror P is moved, the scattering angle $\theta$ cannot be directly measure since the optical path is not visual. Accordingly, the scattering angle $\theta$ may be merely presumed based on a calculating equation representing the relationship between the distance X and the scattering angle $\theta$, or based on the angle at which the light intensity at the photodetector DET is maximized, or the like. This involves the likelihood that an error will be introduced. Further, since the reference light LR passes through the sample, the noise component in the signal is increased. This makes it difficult to measure small-diameter particles of which scattering intensity is small. Thus, the resolution is disadvantageously deteriorated.

There has been also proposed an apparatus, as shown in FIG. 7, in which only the incident light LD is incident upon a sample S through a convex lens LE1, and the resultant scattering light LS is united, at a half-mirror BS, with the reference light LR guided from another optical path, and the heterodyned light is incident upon a photodetector DET, where measurement is carried out. According to this arrangement, measurement similar to that achieved in the apparatus shown in FIG. 6 may be made by integrally moving the sample S and the lenses LE1, LE2 along a direction A. However, it is also difficult, likewise in the apparatus shown in FIG. 6, to directly measure the scattering angle $\theta$.

There has been also proposed a light scattering measuring apparatus in which a reference light is guided along the rotary shaft for rotating a sample stand and the scattering angle may be changed only by rotating the sample stand (P. J. Nash, T. A. King, J.Phys. E:Sci. Instrum., Vol. 18, 1985). As shown in FIG. 8, this light scattering measuring apparatus has a rotary stand T rotatable around a vertical axis of rotation A. Disposed on the rotary stand T are a housing chamber SH for housing a sample S, prisms P5, P7, a half-mirror BS2, pinholes PH, a lens LE, a polarizer PL and a photodetector DET. These members on the rotary stand T are secured thereto in an integrally rotatable manner therewith. The housing chamber SH and the prism P5 are disposed as intersecting the axis of rotation A. Under the rotary stand T, a prism P3 is disposed as intersecting the axis of rotation A.

Of the rays of light emitted from a laser L, the reference light LR reflected by a half-mirror BS1 is guided under the rotary stand and then reflected by the prism P3. The reference light LR reaches the upper portion of the rotary stand T along the axis of rotation A. The reference light LR is then reflected by the prism P5 and advances horizontally. After being reflected by the prism P7, the reference light LR is incident upon the half-mirror BS2. On the other hand, the incident light LD having passed through the half-mirror BS1, is reflected by prisms P2, P4 and passes through the sample housing chamber SH. Then, the scattered light LD is incident upon the half-mirror BS2. After spatial mixing at the half-mirror BS2, the reference light LR and the scattered light LD are incident upon the photodetector DET.

According to the light scattering measuring apparatus having the arrangement above-mentioned, when a portion of the optical path of the reference light LR is identical with the axis of rotation A, the detection angle, i.e., scattering angle, of the direct light LD with respect to the sample, may be freely set merely by rotating the rotary stand T.

In the light scattering measuring apparatus above-mentioned, however, the polaraization of the reference light LR with respect to the rotary stand T is changed with the rotation of the rotary stand T. More specifically, the polarization of the reference light LR guided along the axis of rotation A is changed in direction according to the rotation angle $\theta$ of the rotary stand T when viewed from the coordinate system which rotates together with the rotary stand T. Accordingly, when the reference light LR is incident upon the half-mirror BS2 through the prisms P5, P7 secured to the rotary stand T, the reference light LR presents an angle of polarization corresponding to the rotation angle $\theta$ of the rotary stand T. For example, this will be discussed with reference to FIG. 9 (a) and (b). It is now supposed that the light emitted from the laser L presents a direction of polarization parallel to the plane of the sheet of the drawing as shown in FIG. 9. In FIG. 9 (a), the light spatially mixed at the beam splitter BS2 presents the same direction of polarization Y. When the rotary stand T is rotated with $\theta$ set to 90°, the prism P5 is also rotated at 90°. The reference light LR emitted from the prism P5 in a direction vertical with respect to the drawing plane presents a direction of polarization Z parallel to the drawing plane, as shown in FIG. 9 (b). Accordingly, the lights to be united at the half-mirror BS2 are polarized at a right angle to each other. This decreases the intensity of the signal obtained through a polarizer PL.

To solve such a problem, the author of this document has proposed to interpose a quarter-wave plate in the optical path of the reference light LR to convert the linear polarized light into a circular polarized light, or to increase the power of the reference light LR to utilize the light deviating from the polarized light (generally, even a linear polarized light does not always form a perfectly linear polarized light, but contains some perpendicular component).

However, when the quarter-wave plate is interposed, this presents the problem that the number of component elements is increased. Alternatively, to increase the power of the reference light LR, a large-size laser device is required. This disadvantageously increases the size of the apparatus in its entirety.

In view of the problems above-mentioned, the present invention is proposed with the object of providing a light scattering measuring apparatus in which, without polarization of light being shifted, the scattering angle may be continuously and accurately set by a simple rotating operation and the angle thus set may be readily measured.

SUMMARY OF THE INVENTION

To achieve the object above-mentioned, the light scattering measuring apparatus in accordance with the present invention comprises:

splitting means for splitting coherent light into a direct light to be incident upon a sample and a reference light not to be incident upon the sample;

a half-mirror upon which incident is the scattered light emitted from the sample upon which the direct light has been incident;

a photodetector for receiving the light transmitted through the half-mirror;

reference light guiding means for guiding the reference light, the half-mirror and the photodetector being integrally rotatable around a first rotary shaft passing through the sample, the reference light guiding means being disposed such that the light emitting direction thereof is rotatable around a second rotary shaft, the half-mirror mentioned above being rotatable at its own axis around a third rotary shaft, the first, second and third rotary shafts being parallel to one another, and the direct light, reference light and scattering light being transmitted on the same plane defined perpendicularly with the first, second and third rotary shafts; and a synchronized rotating mechanism adapted to change, according to the rotation angle around the first rotary shaft, (i) the rotation angle of the second rotary shaft being such that the reference light emitted from the reference light guiding means is incident upon the half-mirror, and (ii) the rotation angle of the third rotary shaft being such that the optical path of the reference light is identical with that of the scattering light at the light emitting side of the half-mirror, whereby the light resulting from the spatial mixing of the scattered light emitted from the sample and the reference light, is observed.

According to the light scattering measuring apparatus having the arrangement above-mentioned, the reference light as guided from the reference light guiding means is incident upon the half-mirror, where the reference light is mixed with the scattering light emitted from the sample and the resultant mixed light is incident upon the photodetector. By processing the signal supplied from the photodetector, the Doppler shift may be observed.

More specifically, when measuring the scattering light at an arbitrary scattering angle, the half-mirror and the photodetector may be rotated around the first rotary shaft passing through the sample and set to a desired scattering angle. At this time, by the synchronized rotating mechanism, the reference light emitting direction is changed at a predetermined angle to always direct the reference light toward the half-mirror, and the half-mirror is rotated, at its own axis, at a predetermined angle so that the direction of the scattering light at the light emitting side is identical with the direction of the reference light.

Accordingly, the reference light and the scattering light may be spatially mixed with each other at an arbitrarily set scattering angle.

DESCRIPTION OF THE PREFERRED EMBODIMENTS

The following description will discuss embodiments of the present invention with reference to the attached drawings.

Figure 1A:
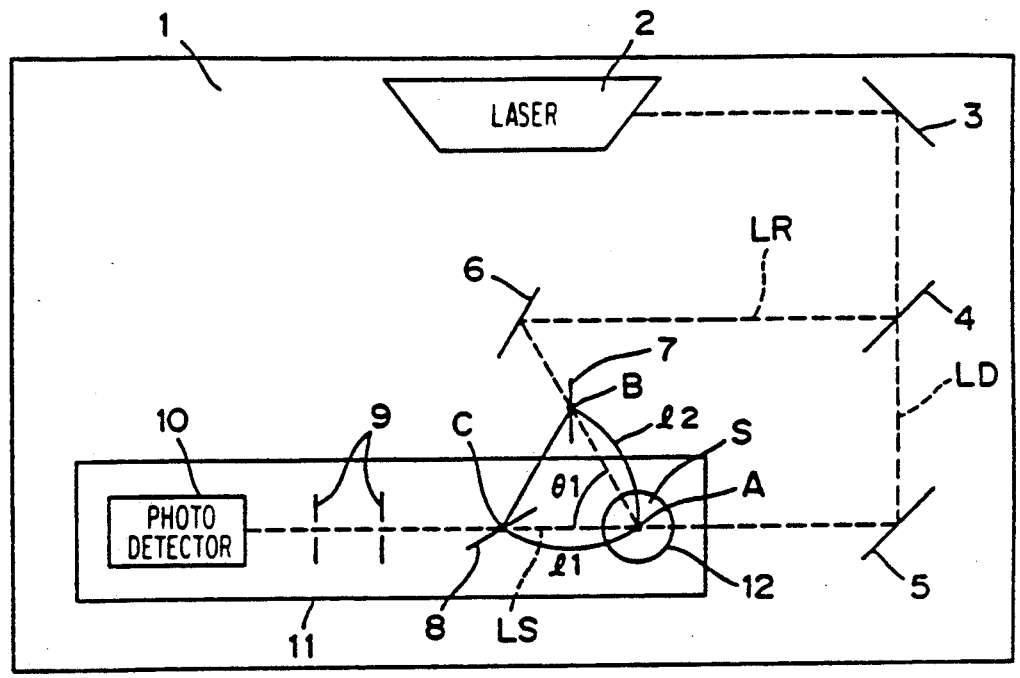
FIG. 1a, b is a schematic view illustrating the arrangement of optical elements in a light scattering measuring apparatus of the present invention.
Figure 1B:
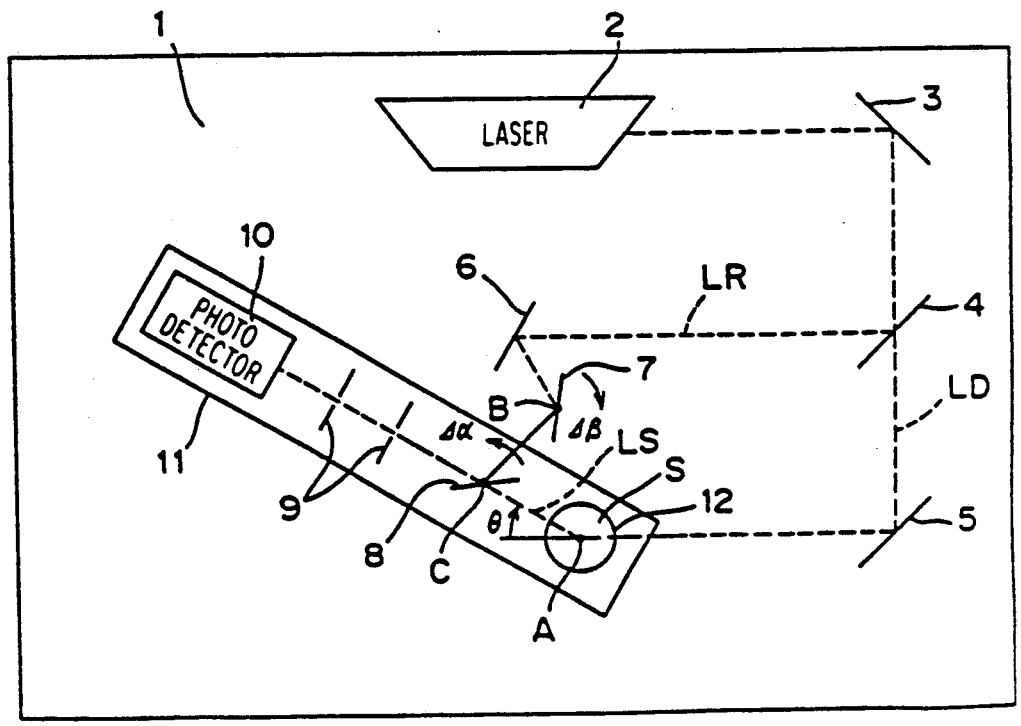

FIG. 1 (a) is a plan view illustrating the arrangement of optical elements in the light scattering measuring apparatus of the present invention.

Mounted on a bench 1 isolated from ambient vibration are a laser device 2, a reflecting mirror 3, a first half-mirror 4, reflecting mirrors 5, 6, a rotary reflecting mirror 7 functioning as reference light guiding means, and a rotary stand 11. A cell 12 for housing a sample S is placed on a first rotary shaft A of the rotary stand 11. Also placed on the rotary stand 11 are a half-mirror 8, a pair of pinholes 9 and a photodetector 10. As the photodetector 10, an electronic photo multiplier, an avalanche photo diode or the like may be used.

The rotary reflecting mirror 7 is rotatable around a second rotary shaft B disposed on the bench 1. The rotary stand 11 is rotatable around the first rotary shaft A disposed on the bench 1 and passing through the sample S. The half-mirror 8 is rotatable around a third rotary shaft C disposed on the rotary stand 11. The reflection direction of a direct light LD reflected by the reflecting mirror 5 is directed toward the photodetector 10 through the first rotary shaft A, the third rotary shaft C and the pinholes 9. The reflection direction of the light reflected by the reflecting mirror 6 is directed toward the second rotary shaft B of the rotary reflecting mirror 7. Its virtual extension line intersects the first rotary shaft A. An angle CAB formed by both directions is set to $\theta_1$. These rotary shafts A, B, C are so set as to be rotated in synchronization at predetermined angles by a synchronized rotating mechanism (to be discussed later) disposed under the rotary stand 11.

Laser light emitted from the laser device 2 is reflected by the reflecting mirror 3 and incident upon the first half-mirror 4. The first half-mirror 4 splits the laser light into the incident light LD which is incident upon the sample S, and a reference light LR which is not incident upon the sample S. The incident light LD is reflected by the reflecting mirror 5 and then incident upon the sample S. The scattered light LS is incident upon the half-mirror 8. On the other hand, the reference light LR split by the first half-mirror 4, is reflected by the reflecting mirror 6, and then incident upon the rotary reflecting mirror 7. After being reflected at a predetermined angle by the rotary reflecting mirror 7, the reference light LR is incident upon the half-mirror 8. At the half-mirror 8, the scattered light LS and the reference light LR are united with each other in one optical path. The resultant joint light is incident upon the photodetector 10 through the pinholes 9.

As described hereinbefore, the scattered light LS having passed through the sample S and the reference light LR are spatially mixed with each other, and the resultant composed light is incident upon the photodetector 10. Accordingly, by obtaining a signal from the photodetector 10 and observing the spectrum, the Doppler shift may be observed.

The following description will discuss the case where the scattering angle is continuously changed in the arrangement mentioned above.

FIG. 1 (b) shows the arrangement where measurement is made with the light scattering angle set to $\theta$. In FIG. 1 (b), the rotary stand 11 is rotated around the first rotary shaft A at the angle $\theta$ clockwise from the position shown in FIG. 1 (a). Accordingly, the rotary reflecting mirror 7 is rotated around the second rotary shaft B clockwise at an angle $\Delta\beta$, and the half-mirror 8 is rotated around the third rotary shaft C counterclockwise at an angle $\Delta\alpha$ with respect to the rotary stand 11.

The angles $\theta$, $\Delta\alpha$ and $\Delta\beta$ establish relations with one another, to be discussed later. Accordingly, even though the rotary stand 11 is rotated, the reference light LR reflected by the rotary reflecting mirror 7 is always directed toward the third rotary shaft C, and the optical path of the scattering light LS downstream of the half-mirror 8, is identical with the optical path of the reflected reference light LR.

Figure 2:
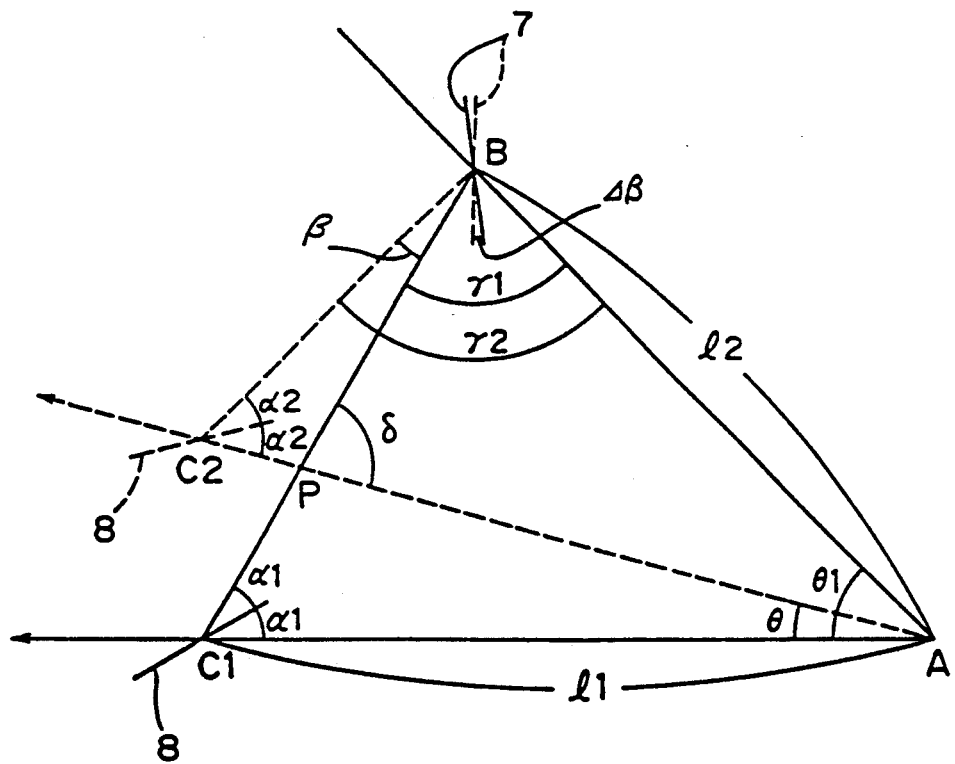
FIG. 2 is a view of optical paths in the main portions of the apparatus in FIG. 1, showing the optical path and angular relationships.

FIG. 2 is a view illustrating only the optical paths and angular relationships before and after the rotary stand 11 is rotated. In FIG. 2, the centers of rotation of the rotary stand 11 and the rotary reflecting mirror 7 are respectively designated by A and B, while the center of rotation of the half-mirror 8 before the rotary stand 11 is rotated, is designated by C1. The distance AC1 and the distance AB are now expressed by $l_1$ and $l_2$, respectively. The angle formed by BA and BC1 is expressed by $\gamma_1$, while the angle formed by AC1 and the half-mirror 8 is expressed by $\alpha_1$. A broken line shows an optical path of the scattering light LS when the rotation angle is equal to $\theta$. C2 shows the position to which the center of rotation C is moved by the rotation of the rotary stand 11. After the rotary stand 11 has been rotated, the angle formed by BA and BC2 is expressed by $\gamma_2$ and the angle formed by AC2 and the half-mirror 8 is expressed by $\alpha_2$. Here, the angles $\gamma_1$ and $\gamma_2$ respectively satisfy the following equations:

$$\gamma_1 = \tan^{-1}\left[\frac{l_1 \sin\theta_1}{l_2 - l_1 \cos\theta_1}\right]$$

$$\gamma_2 = \tan^{-1}\left[\frac{l_1 \sin(\theta_1 - \theta)}{l_2 - l_1 \cos(\theta_1 - \theta)}\right]$$

When P is the point where AC2 intersects BC1, the angle $\delta$ formed by PB and PA satisfies the following equation:

$$\theta + 2\alpha_1 = \delta = \beta + 2\alpha_2 \quad \ldots \quad (1)$$

In this equation, $\beta$ is the angle formed by BC2 and BC1 and expressed by the following equation:

$$\beta = 2\Delta\beta = \gamma_2 - \gamma_1 \ldots \quad (2)$$

The rotation angle of the half-mirror 8 with respect to the rotary stand 11, which is expressed by the equation $\Delta\alpha = \alpha_2 - \alpha_1$, may be expressed, with the use of the equations (1) and (2) above-mentioned, as follows:

$$\Delta\alpha = \{\theta - (\gamma_2 - \gamma_1)\}/2 \ldots \quad (3)$$

Accordingly, $\Delta\alpha$ may be expressed as a function of $\theta$. Further, the rotation angle $\Delta\beta$ of the rotary reflecting mirror 7 may be obtained, with the use of the equations (1) and (2), as follows:

$$\Delta\beta = \beta/2 = \theta/2 - \Delta\alpha \ldots \quad (4)$$

Thus, when the rotation angle $\theta$ of the rotary stand 11 is set, the rotation angle $\Delta\alpha$ of the half-mirror 8 with respect to the rotary stand 11, and the rotation angle $\Delta\beta$ of the rotary reflecting mirror 7 may be respectively obtained.

It is now supposed that the distance $l_2$ between the center of rotation A of the rotary stand 11 and the center of rotation B of the rotary reflecting mirror 7 is equal to the distance $l_1$ between the center of rotation A of the rotary stand 11 and the center of rotation C of the half-mirror 8. In this case, each of the triangles ABC1 and ABC2 is an isosceles triangle. Accordingly, the angles $\gamma_1$ and $\gamma_2$ are respectively expressed by the following equations:

$$\gamma_1 = (180° - \theta_1)/2, \text{ and}$$

$$\gamma_2 = \{180° - (\theta_1 - \theta)\}/2$$

Accordingly, $\Delta\alpha$ and $\Delta\beta$ are respectively expressed by the following equations:

$$\Delta\alpha = \{\theta - (\gamma_2 - \gamma_1)\}/2 \quad (5)$$
$$= \theta/4$$

$$\Delta\beta = \theta/2 - \Delta\alpha = \theta/4 \ldots \quad (6)$$

Thus, $\Delta\alpha$ and $\Delta\beta$ are proportional to $\theta$.

Accordingly, when the rotary stand 11 is rotated at the angle $\theta$, it is merely required to rotate the rotary reflecting mirror 7 by an angle of $\theta/4$ and to rotate the half-mirror 8 at an angle of $\theta/4$ in the reverse direction.

The following description will discuss a synchronized rotating mechanism for rotating the rotary stand 11, the half-mirror 8 and the rotary reflecting mirror 7 at predetermined angles simultaneously.

Figure 3:
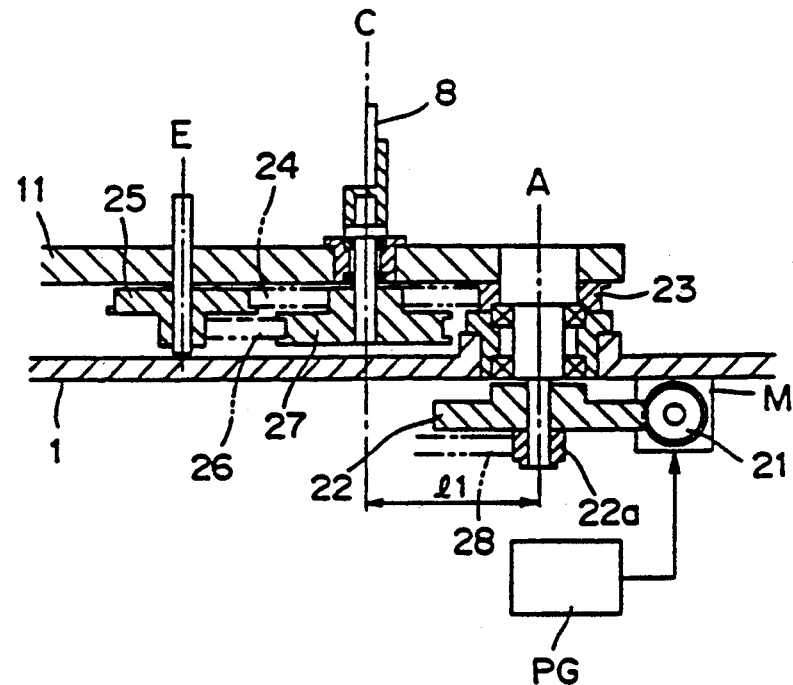
FIG. 3a, b is a section view of a synchronized rotating mechanism of the light scattering measuring apparatus.
Figure 3:
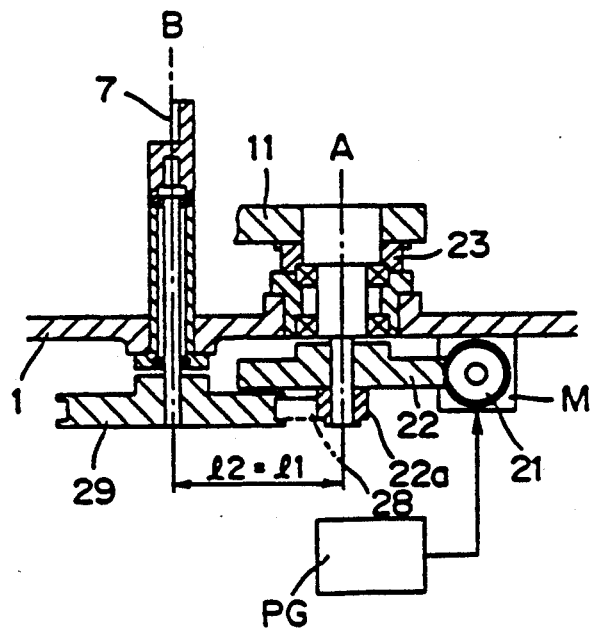

FIG. 3 (a) is a section view of the light scattering measuring apparatus taken along the secton passing through the first rotary shaft A and the third rotary shaft C, while FIG. 3 (b) is a section view of the light scattering measuring apparatus taken along the section passing through the first rotary shaft A and the second rotary shaft B. In the embodiments in FIGS. 3, 4, 5, the distance $l_1$ between the first rotary shaft A and the third rotary shaft C is equal to the distance $l_2$ between the first rotary shaft A and the second rotary shaft B.

Disposed under the bench 1 is a rotating mechanism comprising a worm 21 and a rotary gear 22 coaxial with the rotary shaft A of the rotary stand 11, as shown in FIG. 3 (a). The rotary gear 22 is rotatable integrally with the rotary stand 11. There are disposed a pulse motor M for rotatingly driving the worm 21, and a pulse signal generator PG. Between bench 1 and the rotary stand 11 and secured to bench 1 is disposed a stationary pulley 23 coaxial with the rotary shaft A. A rotary shaft E is rotatably disposed on the rotary stand 11 at a predetermined position thereof. A two-stage pulley 25 is mounted on the rotary shaft E. A pulley 27 is mounted on the third rotary shaft C of the half-mirror 8. A belt 24 is wound between the stationary pulley 23 and the upper stage (having a larger diameter) of the pulley 25, while a belt 26 is wound between the lower stage (having a smaller diameter) of the pulley 25 and the pulley 27. The diametrical ratio of the pulleys 23, 25, 27 is set such that the rotation angle of the rotary gear 22 and the rotation angle of the pulley 27 establish the relationship shown by the equation (5) above-mentioned (4:1).

The following description will discuss how the first rotary shaft A is interlocked with the second rotary shaft B with reference to FIG. 3 (b).

A pulley 22a coaxial with the rotary gear 22 is integrally secured to the underside thereof. The second rotary shaft B of the rotary reflecting mirror 7 stands from the bench 1 at a predetermined position thereof. A pulley 29 is disposed at the lower end of the second rotary shaft B. A belt 28 is wound between the pulley 22a and the pulley 29. The diametrical ratio of the pulleys 22a, 29 is set to 1:4 according to the equation (6) above-mentioned.

With the rotation of the worm 21, the rotary gear 22 is rotated. This causes the rotary stand 11 to be rotated. When viewed from the rotary stand 11, the rotation of the rotary stand 11 causes the stationary pulley 23 to be reversely rotated, causing the pulley 25 to be rotated through the belt 24. The rotation of the pulley 25 is transmitted to the pulley 27 through the belt 26, thereby rotating the third rotary shaft C. This causes the half-mirror 8 to be rotated. Thus, the rotary stand 11 and the half-mirror 8 are rotated in opposite directions at an angular ratio of 4:1.

At the same time, as the rotary stand 11 is rotated, the rotary reflecting mirror 7 attached to the second rotary shaft B may be rotated in the same direction at an angle of $\frac{1}{4}$ of the rotation angle of the rotary stand 11.

As described hereinbefore, by a simple operation for rotating the rotary stand 11, the synchronized rotating mechanism may automatically rotate, with high precision and with the required angular relationship satisfied for the half-mirror 8 and the rotary reflecting mirror 7. It is therefore possible to readily measure the Doppler shift of the light scattering at an arbitrary angle. When scale divisions are marked on the rotary stand 11, a preset scattering angle may be readily measured in a direct manner. This also prevents the plane of polarization of the scattering light LS from being shifted from the plane of polarization of the reference light LR.

The synchronized rotating mechanism should not be limited to the embodiment above-mentioned. For example, rotary gears may be used as shown in FIG. 4, instead of the belts.

Figure 4:
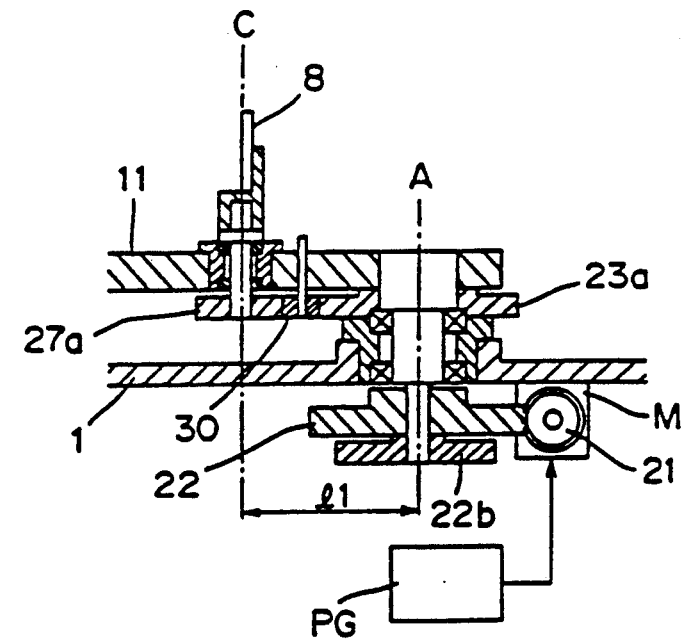
FIGS. 4a, b and 5a, b are section views illustrating modifications of the mechanism in FIG. 3.
Figure 4:
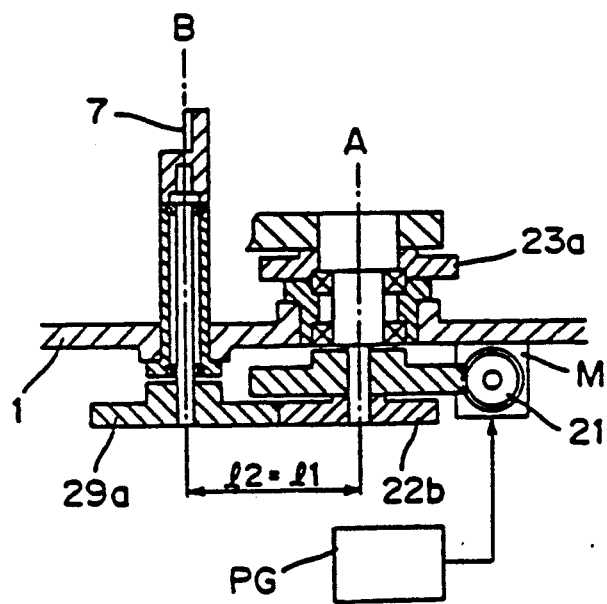

FIG. 4 (a) is a section view of the light scattering measuring apparatus taken along the section passing through the first rotary shaft A and the third rotary shaft C. Likewise in the embodiment above-mentioned, a worm 21 and a rotary gear 22 are disposed under the bench 1. A rotary gear 23a coaxial with the first rotary shaft A is disposed, as secured to the bench 1, between the bench 1 and the rotary stand 11. A rotary gear 27a is mounted on the lower end of the third rotary shaft C of the half-mirror 8. An intermediate gear 30 is rotatably disposed between the rotary gear 23a with respect to the rotary gear 27a is set to 4:1.

FIG. 4 (b) is a section view of the light scattering measuring apparatus taken along the section passing through the first rotary shaft A and the second rotary shaft B. A rotary gear 22b, coaxial and integral with the rotary gear 22, is secured to the underside of the rotary gear 22. The second rotary shaft B of the rotary reflecting mirror 7 stands from the bench 1 at a predetermined position thereof. A rotary gear 29a is mounted on the lower end of the second rotary shaft B. The rotary gears 22b and 29a are meshed with each other. The rotational ratio of the rotary gear 22b with respect to the rotary gear 29a is set to 1:4.

When the worm 21 is rotated, the rotary gear 22 is also rotated. With the rotation of the rotary gear 22, the rotary stand 11 is rotated and the rotary gear 23a is rotated in the opposite direction to the rotation direction of the rotary stand 11. This causes the rotary gear 27a to be rotated in the same direction. Thus, the rotary stand 11 and the half-mirror 8 are rotated in the opposite directions at an angular ratio of 1:4. With the rotation of the rotary stand 11, the rotary reflecting mirror 7 attached to the second rotary shaft B may be rotated in the same direction at an angle of ¼ of the rotation angle of the rotary stand 11.

Accordingly, the embodiment shown in FIG. 4 may achieve the same effect as that in the embodiment shown in FIG. 3. That is, by a simple operation for rotating the rotary stand 11, the half-mirror 8 and the rotary reflecting mirror 7 may be rotated with the required angular relationship automatically satisfied. It is therefore possible to measure the Doppler shift of the light scattering from the sample at an arbitrary angle.

In the embodiments in FIGS. 3 and 4, when rotating the rotary stand 11, the rotary stand 11 may be manually rotated without the motor M, the worm 21 and the rotary gear 22 disposed.

Figure 5:
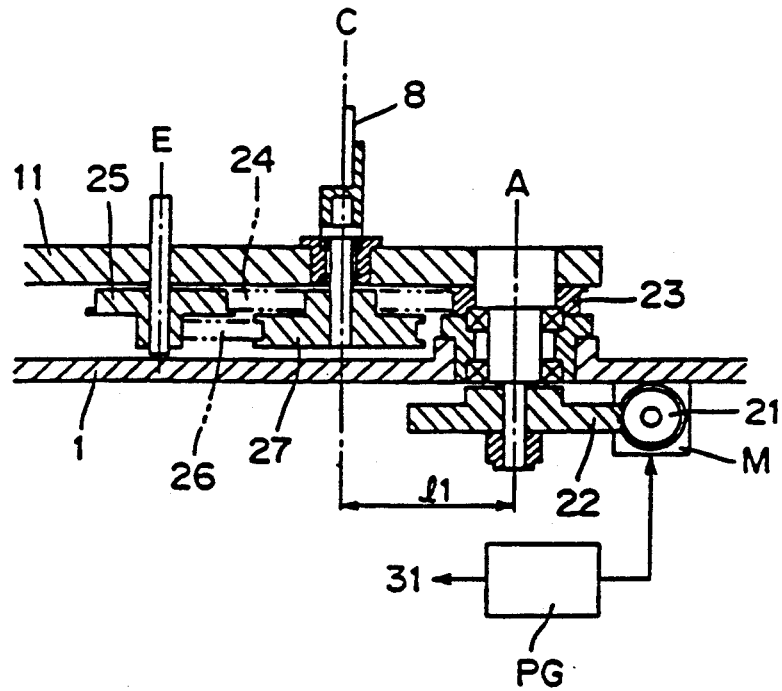
Figure 5:
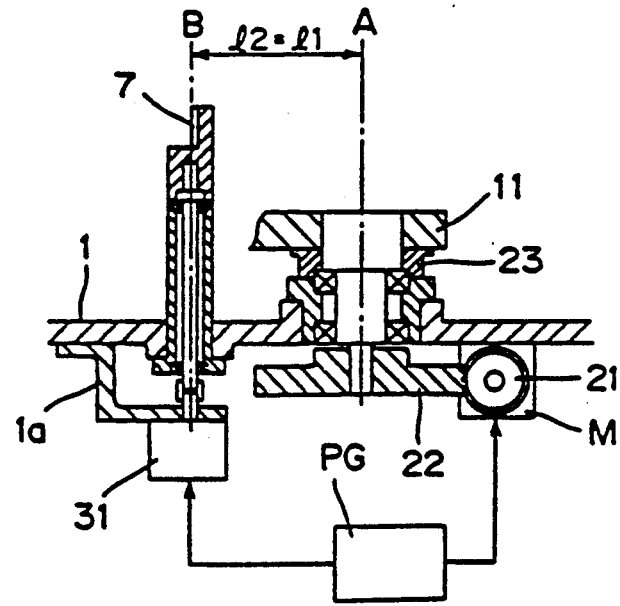
Figure 6:
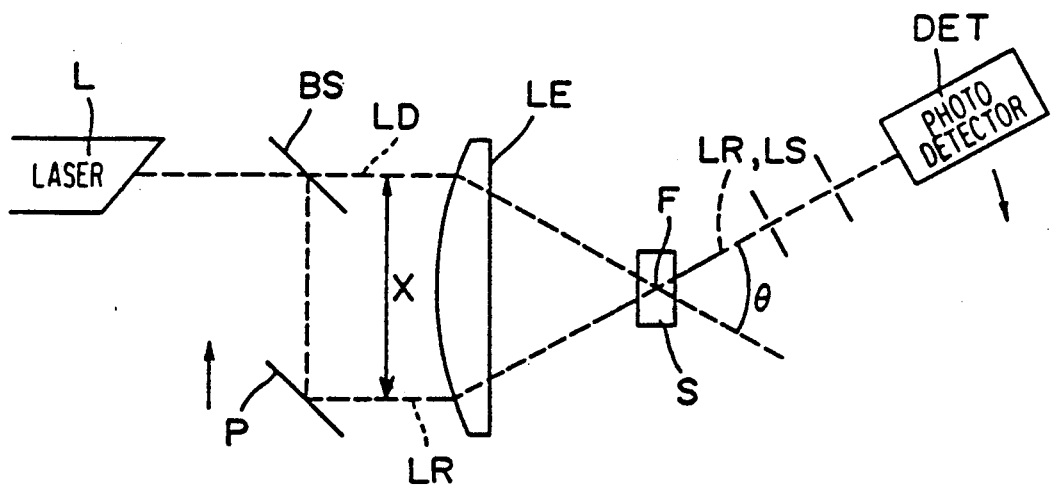
FIGS. 6 and 7 are schematic views of conventional light scattering measuring apparatus using lenses.
Figure 7:
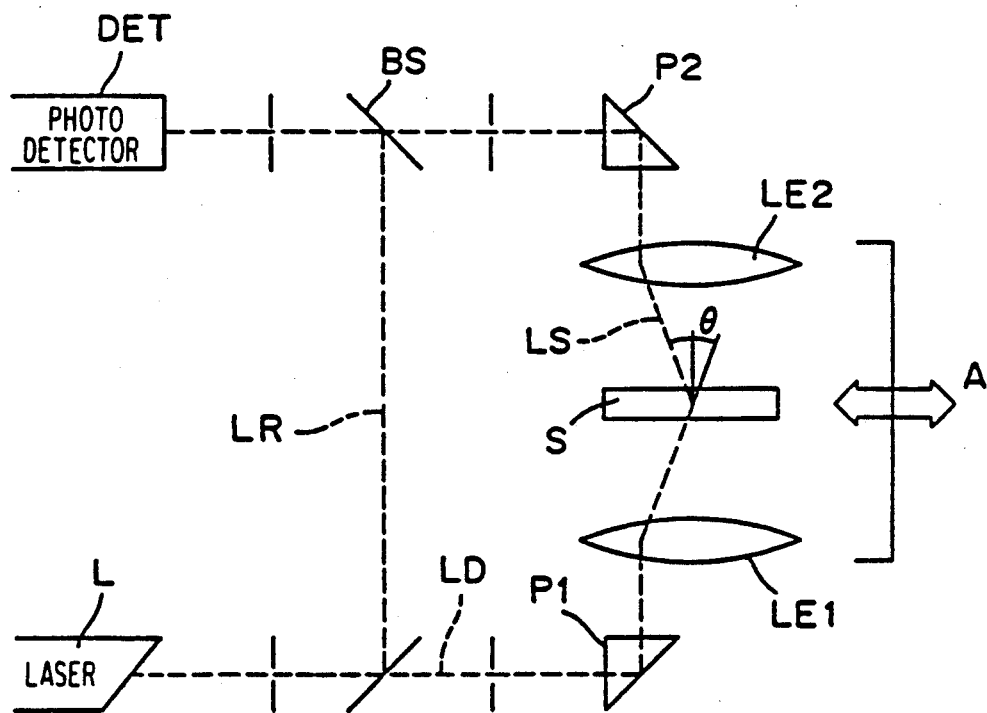
Figure 8:
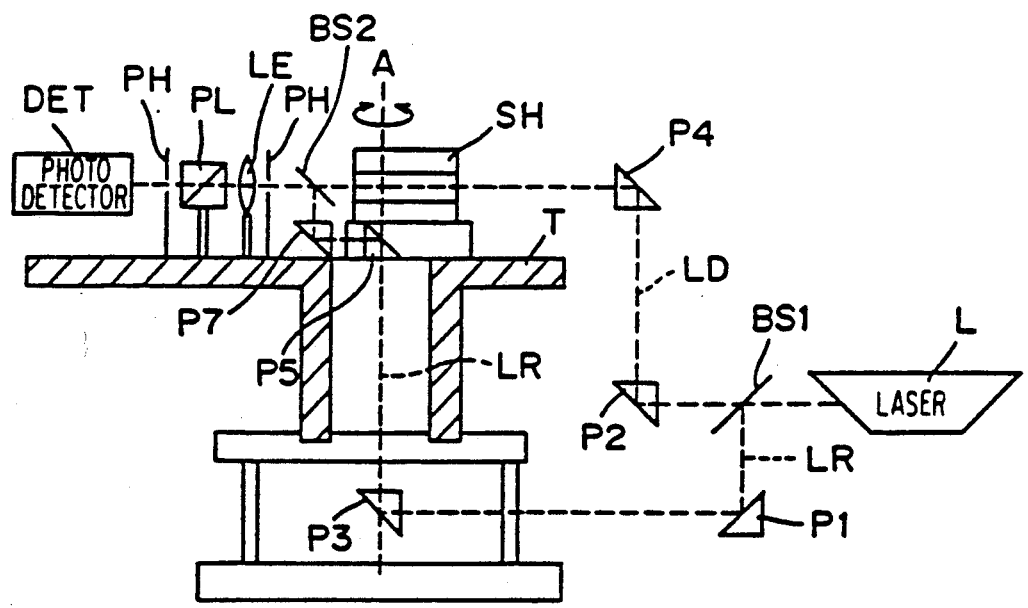
FIG. 8 is a schematic view, with portions in section, of a conventional rotary-type light scattering measuring apparatus.
Figure 9:
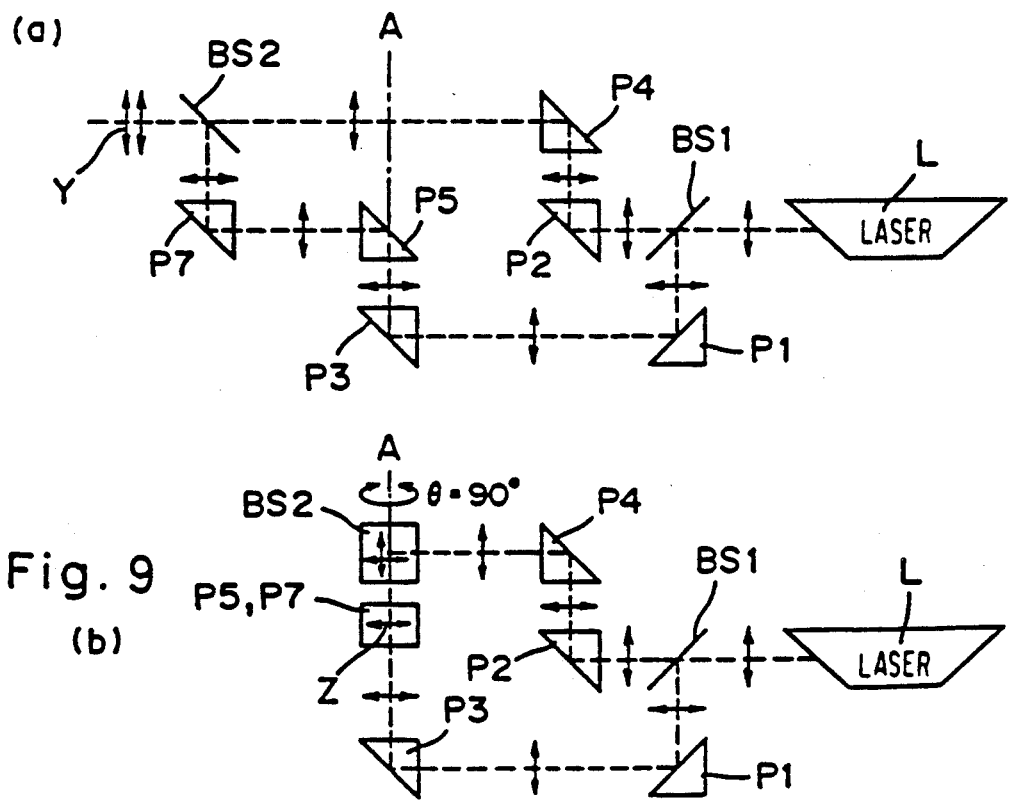
FIG. 9a, b is a schematic view illustrating the arrangement of optical elements in the light scattering measuring apparatus in FIG. 8.

FIG. 5 shows a further embodiment of the present invention. This embodiment in FIG. 5 is different from the embodiment in FIG. 3 in that the second rotary shaft B of the rotary reflecting mirror 7 is rotatingly driven by a pulse motor 31. The pulse motor 31 is adapted to receive a driving pulse from a pulse signal generator PG. The interval between the driving pulse supplied to the pulse motor 31 and the driving pulse supplied to the pulse motor M is set such that the rotational ratio of the first rotary shaft A with respect to the second rotary shaft B satisfies the equations (5) and (6) above-mentioned. Accordingly, the rotary stand 11, the half-mirror 8 and the rotary reflecting mirror 7 may be rotated with the required angular relationship automatically satisfied, as done the embodiments mentioned earlier.

In the embodiment in FIG. 5, instead of the arrangement in which the pulse signal generator PG supplies a driving pulse to the pulse motor 31, a rotation angle sensor for reading the rotation angle of the rotary gear 22 may be disposed so that, based on a detection signal from the rotation angle sensor, a pulse signal to be supplied to the pulse motor 31 is obtained.

In FIGS. 3 to 5, the description has been made of the embodiments in which the distance $l_1$ is equal to the distance $l_2$. However, the present invention may be embodied in the form of a general application in which the distance $l_1$ is not equal to the distance $l_2$. In this case, the rotation angles of the second rotary shaft B and the third rotary shaft C are not always proportional to the rotation angle of the first rotary shaft A. In this connection, additional pulse motors may be respectively disposed for the second rotary shaft B and the third rotary shaft C, so that the rotation amounts of the pulse motors are electrically controlled according to the equations (3) and (4) above-mentioned.

The description has been made of the light scattering measuring apparatus of the present invention with reference to the attached drawings. However, the present invention should not be limited to the embodiments above-mentioned. For example, instead of the rotary reflecting mirror 7 serving as reference light guiding means, an optical fiber capable of holding the plane of polarization may be used to rotate the light emitting end.

Figure 10:
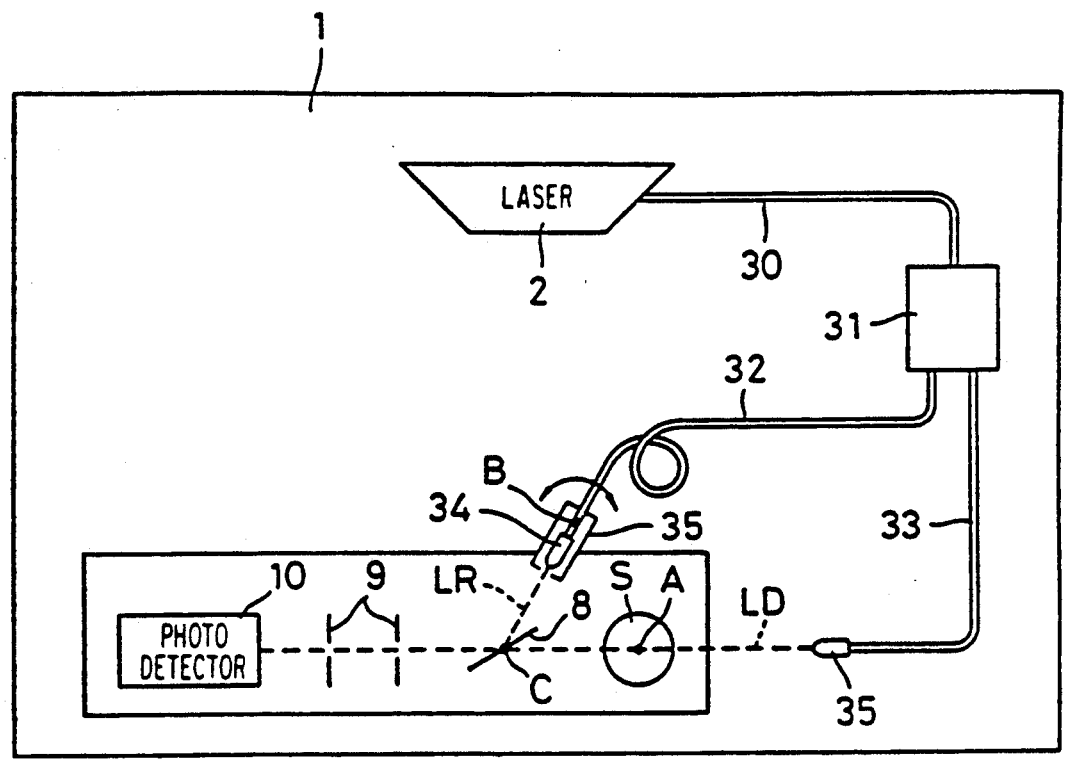
FIGS. 10 and 11a, b are views illustrating modifications of reference light guiding means.

FIG. 10 shows an embodiment of the present invention using an optical fiber.

In this embodiment, light emitted from a laser device 2 is guided to an optical fiber 30 and split in two different directions by a light splitting device 31. The light guided to an optical fiber 33 is incident, as a direct light LD, upon a sample S. The light guided to another optical fiber 32 is incident, as a reference light LR, upon a third rotary shaft C from an output end 34. The output end 34 is held by an arm 35. By rotating the arm 35 around a rotary shaft B, the reference light LR may always be incident upon the third rotary shaft C.

Figure 11:
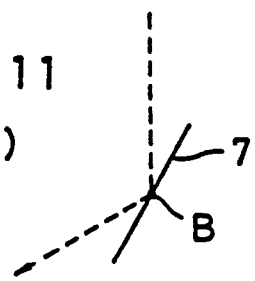
Figure 11:
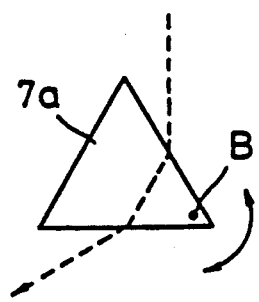

FIG. 11 shows a modification in which a refractive prism 7a (FIG. 11 (b)) is used instead of the rotary reflecting mirror 7 (FIG. 11 (a)). In this modification, the angle of a refracted light may be changed by rotating the refractive prism 7a around the rotary shaft B.

Other modifications and variations of the present invention may be made without departing from the scope of the invention.

As described in the foregoing, according to the light scattering measuring apparatus of the present invention, the half-mirror and the photodetector may be continuously rotated around the first rotary shaft passing through a sample and set to a desired scattering angle. Simultaneously, by the interlockingly rotating mechanism, the reference light emitting direction may be rotated at a predetermined angle, causing the reference light to be directed toward the half-mirror at all times. The half-mirror may also be rotated on its own axis at a determined angle, so that the direction of the scattering light at the light emitting side of the half-mirror is identical with the reference light direction. Accordingly, the reference light may be composed with the scattering light at an arbitrary scattering angle, enabling the observation of the Doppler shift in the scattering light direction.

Provision is made such that the half-mirror and the photodetector may be integrally rotated manually or automatically. Accordingly, the rotation angle may be accurately set and the rotation angle thus set may be made sure whenever it is desired. By the interlockingly rotating mechanism, the angle of rotation of the half-mirror at its own axis and the direction of the light emitted from the reference light guiding means may be automatically set simultaneously with the rotation of the half-mirror and the photodetector. This eliminates the need of complicated alignment of optical paths or angle adjustment. Further, the polarization of the scattering light and the reference light may be maintained at any angle. It is therefore not necessary to correct the polarization by intentionally interposing a polarizer as conventionally done. This simplifies the apparatus in structure.

What is claimed is:

1. A light scattering measuring apparatus comprising:
   splitting means for splitting a coherent light into a direct light which is to be incident upon a sample and a reference light which is not to be incident upon said sample;
   a half-mirror upon which is incident the scattered light emitted from said sample upon which said direct light has been incident;
   a photodetector for receiving the light transmitted through said half-mirror;
   reference light guiding means for guiding said reference light,
   said half-mirror and said photodetector being integrally rotatable around a first rotary shaft passing through said sample, said reference light guiding means being disposed such that the light emitting direction thereof is rotatable around a second rotary shaft, said half-mirror being rotatable about its own axis around a third rotary shaft, said first, second and third rotary shafts being parallel to one another, said direct, reference and scattering lights being transmitted on the same plane defined perpendicularly to said first, second and third rotary shafts; and synchronized rotating mechanism adapted to change, according to the rotation angle around said first rotary shaft, the rotation angle of said second rotary shaft being such that said reference light emitted from said reference light guiding means is incident upon said half-mirror, and the rotation angle of said third rotary shaft being such that the optical path of said reference light is identical with that of said scattering light at the light emitting side of said half mirror, whereby the light resulting from the spatial mixing of aid scattered light emitted from said sample and said reference light, is observed.

2. A light scattering measuring apparatus as set forth in claim 1, wherein the distance between the first rotary shaft and the second rotary shaft is equal to the distance between said first rotary shaft and the third rotary shaft, and the synchronized rotating mechanism is adapted to control such that each of the rotation angles of said second and third rotary shafts is equal to a quarter of the rotation angle of said first rotary shaft.

3. A light scattering measuring apparatus as set forth in claim 1, further comprising a motor for automatically rotating the first rotary shaft.

4. A light scattering measuring apparatus as set forth in claim 1, wherein the first rotary shaft is manually rotatable.

5. A light scattering measuring apparatus as set forth in claim 1, wherein the synchronized rotating mechanism comprises belts and pulleys for which a predetermined rotational ratio is set.

6. A light scattering measuring apparatus as set forth in claim 1, wherein the synchronized rotating mechanism comprises gears for which a predetermined rotational ratio is set.

7. A light scattering measuring apparatus as set forth in claim 1, wherein the synchronized rotating mechanism comprises motors and rotation-amount controlling means for controlling the rotation amounts of said motors.

8. A light scattering measuring apparatus as set forth in claim 1, wherein the reference light guiding means is a reflecting mirror.

9. A light scattering measuring apparatus as set forth in claim 1, wherein the reference light guiding means is an optical fiber, and the splitting means is a light splitting device.

10. A light scattering measuring apparatus as set forth in claim 1, wherein the reference light guiding means is a refractive prism.

11. A light scattering measuring apparatus as set forth in claim 1, wherein the splitting means is a half-mirror.

* * * * *